(12) United States Patent
Dortch, Jr.

(10) Patent No.: US 9,464,579 B2
(45) Date of Patent: Oct. 11, 2016

(54) ISOTHERMAL COMPRESSION BASED COMBUSTION ENGINE

(71) Applicant: Richard W. Dortch, Jr., Jackson, MS (US)

(72) Inventor: Richard W. Dortch, Jr., Jackson, MS (US)

(73) Assignee: Richard W. Dortch, Jr., Jackson, MS (US)

( * ) Notice: Subject to any disclaimer, the term of this patent is extended or adjusted under 35 U.S.C. 154(b) by 165 days.

(21) Appl. No.: 14/549,375

(22) Filed: Nov. 20, 2014

(65) Prior Publication Data

US 2015/0136071 A1 May 21, 2015

Related U.S. Application Data

(60) Provisional application No. 61/906,467, filed on Nov. 20, 2013, provisional application No. 61/935,025, filed on Feb. 3, 2014.

(51) Int. Cl.
| | |
|---|---|
| *F02B 3/08* | (2006.01) |
| *F02D 13/02* | (2006.01) |
| *F02B 21/00* | (2006.01) |
| *F02M 23/00* | (2006.01) |

(52) U.S. Cl.
CPC ........... *F02D 13/0276* (2013.01); *F02B 21/00* (2013.01); *F02B 2275/14* (2013.01); *F02M 2023/008* (2013.01); *Y02T 10/123* (2013.01); *Y02T 10/18* (2013.01)

(58) Field of Classification Search
CPC ............ F02B 3/08; F02B 3/06; F02B 47/08; F02B 13/0276; F02B 17/005; F02B 2275/14; F02M 2023/008; Y02T 10/18; Y02T 10/123
See application file for complete search history.

(56) References Cited

U.S. PATENT DOCUMENTS

| | | | | |
|---|---|---|---|---|
| 5,016,597 | A * | 5/1991 | Borst | F02B 63/06 |
| | | | | 123/533 |
| 5,064,423 | A | 11/1991 | Lorenz et al. | |
| 6,817,185 | B2 * | 11/2004 | Coney | F02B 33/34 |
| | | | | 60/39.511 |
| 2003/0049139 | A1 | 3/2003 | Coney et al. | |
| 2007/0245982 | A1 | 10/2007 | Sturman | |
| 2010/0031934 | A1 | 2/2010 | Tayyari | |
| 2012/0186249 | A1 | 7/2012 | Guzzella et al. | |
| 2012/0240909 | A1 | 9/2012 | Geyer | |

OTHER PUBLICATIONS

Foreign Communication From a Counterpart Application, PCT Application No. PCT/US2014/066694, International Search Report dated Mar. 31, 2015, 5 pages.
Foreign Communication From a Counterpart Application, PCT Application No. PCT/US2014/066694, Written Opinion dated Mar. 31, 2015, 4 pages.

* cited by examiner

*Primary Examiner* — Hieu T Vo
(74) *Attorney, Agent, or Firm* — Conley Rose, P.C.; J. Robert Brown, Jr.; Michael J. Schofield

(57) ABSTRACT

Systems and methods are disclosed that include operating an isothermal compression based combustion (IsoC) engine by injecting isothermally compressed air into a combustion engine immediately prior to a combustion event in order to increase the efficiency of the engine, improve emissions, and substantially eliminate autoignition and associated design constraints. The IsoC engine utilizes an intercooled compressor to isothermally compress air that is stored in a plurality of capacitance tanks prior to delivery of the compressed air to the combustion engine. The IsoC engine allows combustion to be selectively terminated to increase fuel efficiency, thereby resulting in a hybrid compressed air-motor and internal combustion operated IsoC engine.

20 Claims, 4 Drawing Sheets

ISOTHERMAL COMPRESSION BASED COMBUSTION ENGINE

CROSS-REFERENCE TO RELATED APPLICATIONS

The present application claims priority under 35 U.S.C. §119(e) to U.S. Provisional Patent Application No. 61/906,467 filed on Nov. 20, 2013 by Dortch, entitled "Isothermal Compression Based Combustion Engine" and U.S. Provisional Patent Application No. 61/935,025 filed on Feb. 3, 2014 by Dortch, entitled "Isothermal Compression Based Combustion Engine," the disclosures of which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional combustion engines include an intake stroke followed by a compression stroke. Generally, a mixture of air and fuel is introduced into a combustion chamber of the engine during the intake stroke and thereafter compressed by a piston during the compression stroke. Compression of the air/fuel mixture significantly increases the temperature and pressure of the mixture. Autoignition may occur when the compressed air/fuel mixture reaches a temperature that causes it to spontaneously ignite prior to a spark plug firing to ignite the air/fuel mixture and may cause damage to the engine. Accordingly, design features of traditional combustion engines such as static compression ratio, forced induction capacity, power density, fuel economy, and fueling options are constrained by the limits of autoignition.

SUMMARY

In some embodiments of the disclosure, an isothermal compression based combustion (IsoC) engine is disclosed as comprising: a compressor configured to isothermally compress a volume of air; at least one capacitance tank coupled to the compressor and configured to store the volume of isothermally compressed air; and a combustion engine configured to receive at least a portion of the volume of isothermally compressed air into a cylinder of the combustion engine; at least one of (1) selectively inject a volume of fuel into the cylinder and ignite the volume of fuel in the presence of the volume of air in the cylinder and (2) selectively omit the injection of a volume of fuel and expand the volume of air in the cylinder using no combustion.

In other embodiments of the disclosure, a method of operating an isothermal compression based combustion (IsoC) engine is disclosed as comprising: isothermally compressing a first volume of air; passing the isothermally compressed volume of air to at least one capacitance tank; storing the isothermally compressed volume of air in the at least one capacitance tank; injecting a second volume of isothermally compressed air into a cylinder of a combustion engine when an associated piston is at about a top dead center (TDC) position; selectively injecting a volume of fuel into the cylinder of the combustion engine; and combusting the mixture of the second volume of isothermally compressed air and the volume of fuel in the cylinder of the combustion engine.

In yet other embodiments of the disclosure, a method of controlling an isothermal compression based combustion (IsoC) engine is disclosed as comprising: selectively injecting a volume of isothermally compressed air into a cylinder of a combustion engine when an associated piston is at about a top dead center (TDC) position; selectively injecting a volume of fuel into the cylinder; selectively receiving an input through a user interface; and selectively adjusting at least one of the volume of compressed air and the volume of fuel injected into a cylinder of the combustion engine during subsequent rotations of a crankshaft of the combustion engine.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of an isothermal compression based combustion (IsoC) engine. The IsoC engine may inject ambient temperature compressed air into a combustion engine immediately prior to a combustion event in order to increase the efficiency of the engine. The IsoC engine may also comprise a turbocharger coupled to an isothermal compressor and the exhaust stream from the combustion engine to increase airflow into the compressor. The IsoC engine may further comprise capacitance air tanks that may be employed to drive the combustion engine pistons and allow combustion to be selectively terminated to increase fuel efficiency and curtail emissions. The IsoC engine may also be compatible with regenerative braking. The IsoC engine may also employ lean burns (e.g. combustion of mixtures with an excess of air to fuel in the combustion chamber) to increase fuel efficiency and decrease exhaust emissions. The IsoC engine may also comprise a carbon sequestration filter to further decrease net carbon emissions. Additionally, the components supporting IsoC engine efficiency may provide the hardware necessary to operate the engine as a dual-drive hybrid platform. The high pressure pneumatic components of the IsoC engine that facilitate thermal efficiency may also allow the engine to operate as a zero-emissions air motor using no combustion at all.

Figure 1:
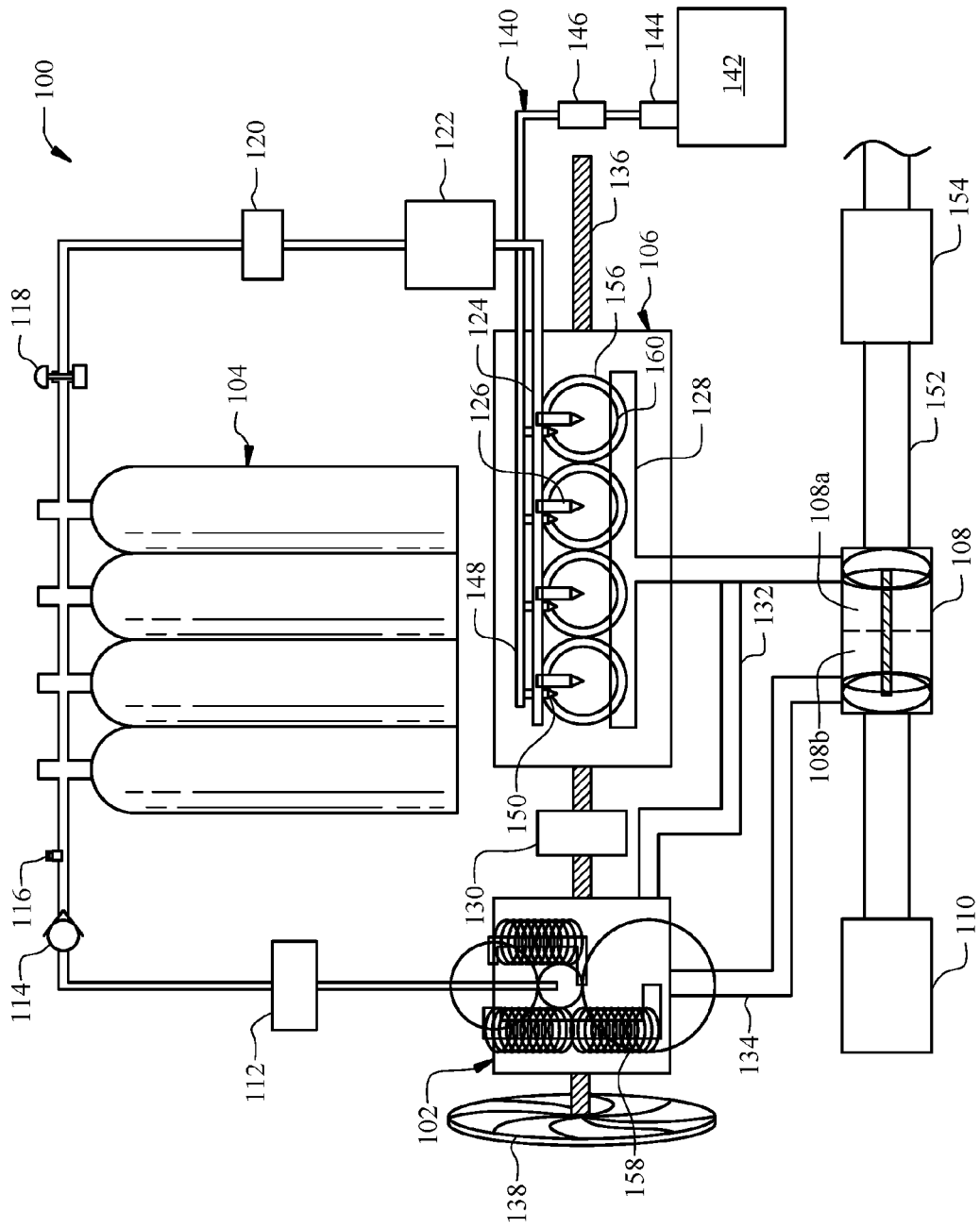
FIG. 1 is a schematic diagram of an isothermal compression based combustion (IsoC) engine according to an embodiment of the disclosure.

Referring now to FIG. 1, an isothermal compression based combustion (IsoC) engine 100 is shown according to an embodiment of the disclosure. The IsoC engine 100 is a combustion engine that continuously substitutes an isothermally-cooled compression charge (the charge being at, or very near ambient temperature) for the hot adiabatic compression leveraged in traditional combustion engine cycles. The absence of compression heat inside the IsoC engine 100 cylinders 156 prior to spark-ignition substantially eliminates autoignition as a design boundary for the isothermally compressed combustion engine. Most generally, the IsoC engine 100 comprises an intercooled, multistage compressor 102 configured to collect and compress ambient air while rejecting the heat of compression, at least one capacitance tank 104 configured to store the cooled compressed air, and a combustion engine 106 configured to power a drive drain or other apparatus as a result of injecting isothermally compressed air from the at least one capacitance tank 104 and/or fuel supplied by the fuel system 140 into a plurality of cylinders 156 of the combustion engine 106. Additionally, in some embodiments, the IsoC engine 100 may also comprise a turbocharger 108 configured to increase the flow of air to the compressor 102.

The compressor 102 may generally be configured to isothermally compress air and pass the compressed air to at least one capacitance tank 104 coupled to the compressor 102. The compressor 102 is generally configured as an intercooled, multistage piston compressor. In some embodiments, the compressor 102 may be a scroll-type compressor. In other embodiments, the compressor 102 may be a rotary-type compressor. However, in yet other embodiments, the compressor 102 may be any other type of suitable compressor capable of increasing the pressure of a body of air received by the compressor 102. The compressor 102 comprises at least one compressor fan 138 and at least one heat exchanger 158 configured to dissipate heat caused by compressing the air within the compressor 102. The compressor fan 138 is configured to generate a passing airflow across the heat exchanger 158 to facilitate heat transfer between the passing airflow and the heat exchanger 158. Additionally, the heat exchanger 158 may include fins, heat sinks, intercoolers, and/or any combination of fins, heat sinks, intercoolers, and other features that are configured to promote heat transfer between a passing airflow and the heat exchanger 158. In some embodiments, heat rejected from the heat exchanger 158 of the compressor 102 may be purposed to provide cabin heating, oil heating in cold climates, and/or other ancillary uses. The heat exchanger 158 of the compressor 102 may also be configured for liquid cooling. By rejecting heat caused by the compression of air within the compressor 102, the compressor 102 is capable of isothermally compressing the air within the compressor 102. In some embodiments, the isothermally compressed air may have a temperature that is substantially similar to the temperature of the ambient air entering the compressor 102. The passing airflow may dissipate the heat into ambient air or alternatively be diverted through a compressor exhaust 132. The compressor exhaust 132 may be coupled to a hot side 108b of the turbocharger 108. As will be discussed later in further detail, by passing the heat rejected from the heat exchanger 158 of the compressor 102 through the hot side 108b of the turbocharger 108, heat energy rejected by the heat exchanger 158 of the compressor 102 may be recovered by the turbocharger 108 to further increase the efficiency of the compressor 102 and/or the IsoC engine 100.

The compressor 102 supplies isothermally compressed air to the at least one capacitance tank 104 through a line dryer 112 disposed between the compressor 102 and the at least one capacitance tank 104. The line dryer 112 is configured to remove moisture from the isothermally compressed air coming from the compressor 102. A check valve 114 may also be disposed between the compressor 102 and the at least one capacitance tank 104. The check valve is configured to prevent isothermally compressed air from a downstream side closer to the at least one capacitance tank 104 from flowing in an upstream direction towards the compressor 102. Additionally, an external fill port 116 may be disposed between the check valve 114 and the at least one capacitance tank 104. The external fill port 116 is configured to couple to an external compressed air source to allow the at least one capacitance tank 104 to receive compressed air through the external fill port 116 from the external compressed air source. Further, the check valve 114 may also prevent compressed air received from an external compressed air source through the external fill port 116 to flow towards the compressor 102.

While the IsoC engine 100 is disclosed as having at least one capacitance tank 104, it will be appreciated that the IsoC engine 100 may include a plurality of capacitance tanks 104. The capacitance tanks 104 are generally configured to store isothermally compressed air received from the compressor 102. Further, the capacitance tanks 104 are configured to supply a charge of isothermally compressed air to the combustion engine 106. The capacitance tanks 104 may generally comprise a lightweight, high-strength construction. In some embodiments, the capacitance tanks 104 may comprise a carbon fiber composite construction. In some embodiments, the capacitance tanks 104 may be charged to a pressure of up to about 500 pounds per square inch (psi), up to about 1,000 psi, up to about 2,000 psi, up to about 3,000 psi, up to about 4,000 psi, and/or up to about 5,000 psi.

On the downstream side of the capacitance tanks 104, the IsoC engine 100 includes a shutoff valve 118. The shutoff valve 118 is selectively operable to substantially restrict and/or substantially prevent compressed air stored in the capacitance tanks 104 from passing into the combustion engine 106. In some embodiments, the shutoff valve 118 may be a manually-controlled shutoff valve. However, in other embodiments, the shutoff valve 118 may be an electronically-controlled valve that may be selectively operated to allow or restrict the flow of compressed air from the capacitance tanks 104 to the combustion engine 106. In yet other embodiments, the shutoff valve 118 may be pneumatically actuated by a sudden change in pressure as a fail-safe emergency cutoff. Additionally, as will be discussed in further detail herein, the IsoC engine 100 may also include a carbon dioxide sequestration filter 120 between the capacitance tanks 104 and the combustion engine 106. The carbon dioxide sequestration filter 120 may generally comprise a cartridge of granulated metal oxides that may sequester free atmospheric carbon dioxide as the associated IsoC engine 100 is operating.

Most generally, the capacitance tanks 104 are configured to supply charges of isothermally compressed air into the cylinders 156 of the combustion engine 106. The capacitance tanks 104 supply the compressed air through a pressure regulator 122 and to a common air rail 124, where the compressed air is substantially evenly distributed to a plurality of air injectors 126. The pressure regulator 122 may generally be configured to selectively control, limit, and/or restrict the pressure of the compressed air entering the common air rail and/or the cylinders 156 of the combustion engine 106. However, in some embodiments, the pressure regulator 122 may be configured to selectively allow a substantially unrestricted flow of compressed air to the common air rail 124, and/or vary the pressure as a type of throttle in some operating modes and conditions. Generally, each cylinder 156 receives compressed air through a single air injector 126. However, in some embodiments, each cylinder 156 of the combustion engine 106 may receive compressed air through a plurality of air injectors 126. The air injectors 126 of the IsoC engine 100 may be actuated mechanically, pneumatically, hydraulically and/or electro-magnetically. It will be appreciated that the delivery of the compressed air from the capacitance tanks 104 to the air injectors 126 and into the cylinders 156 of the combustion engine may be electronically controlled.

The IsoC engine 100 also comprises a fuel system 140 that is configured to supply fuel to each of the plurality of cylinders 156 of the combustion engine 106. The fuel system 140 comprises a fuel reservoir 142 configured to store a volume of fuel, a fuel pump 144 configured to pump fuel from the fuel reservoir 142, a fuel filter 146 configured to remove particulates from the fuel, a fuel rail 148, and a plurality of fuel injectors 150. The fuel system 140 is configured to store a volume of fuel in the fuel reservoir 142 and pump fuel from the fuel reservoir 142 through the fuel filter 146 to the fuel rail 148, where the fuel is substantially evenly distributed to the plurality of fuel injectors 150. In some embodiments, the fuel system 140 is configured to deliver fuel to the cylinders 156 of the combustion engine 106 simultaneously with isothermally compressed air from the capacitance tanks 104. However, in some embodiments and modes of operation, only compressed air may be injected into the cylinders 156 of the combustion engine 106. Furthermore, it will be appreciated that the delivery of the fuel through the fuel system 140 may be electronically controlled.

The combustion engine 106 is generally configured to operate in response to combusting a mixture of compressed air delivered from the capacitance tanks 104 and fuel delivered from the fuel system 140. In some embodiments, the combustion engine 106 may also be configured to operate in response to only injecting compressed air from the capacitance tanks 104 into the cylinders 156 of the combustion engine 106. In some embodiments, the combustion engine 106 may comprise a four-stroke combustion engine. However, in other embodiments, the combustion engine 106 may comprise a two-stroke combustion engine. The combustion engine generally comprises a plurality of cylinders 156, each cylinder having a piston 160 that is driven by a crankshaft 136. The combustion engine 106 is further configured to expel exhaust gases through an exhaust manifold 128. The combustion engine 106 is generally coupled to the compressor 102 by a crankshaft 136 through a selectively engaged compressor clutch 130. Accordingly, the compressor 102 is selectively driven by the combustion engine 106 through selective engagement of the compressor clutch 130. By engaging the compressor clutch 130, the rotation of the crankshaft 136 caused by operating the combustion engine 106 drives the compressor 102. In some embodiments, the compressor clutch 130 may comprise additional design and safety elements such as gearing, slip-clutching, and governing the speed and torque delivered from the combustion engine 106 to the compressor 102. Further, in some embodiments, the compressor clutch 130 may be selectively disengaged when the IsoC engine 100 is operating as a compressed air motor.

In some embodiments, the IsoC engine 100 comprises a turbocharger 108. The turbocharger 108 is coupled to the exhaust manifold 128 and configured to recover energy from exhaust gases that may otherwise be lost. The turbocharger 128 may be described as having a cold side 108*a* and a hot side 108*b*. The hot side 108*b* of the turbocharger 108 receives exhaust gases from the combustion engine 106 through the exhaust manifold 128 and passes the exhaust gases through an exhaust pipe 152 to the atmosphere. In some embodiments, depending on the application of the IsoC engine 100, the turbocharger 108 may also pass the exhaust gases through a catalytic converter 154. The exhaust gases passing through the hot side 108*b* of the turbocharger 108 rotate a shaft in the turbocharger 108 and cause a second impeller compressor on the cold side 108*a* of the turbocharger 108 to draw ambient air through the air filter 110 and force the air into the compressor 102 through an intake pipe 134. The turbocharger 108, when configured to force-induce the compressor 102, acts as an additional pumping stage, thus improving volumetric delivery while reducing the work demand at the compressor 102 and/or a crankshaft 136 of the compressor 102. The output of the turbocharger 108 may also be intercooled prior to passing air into the compressor 102. Additionally, in some embodiments, heat rejected from the compressor 102 by the heat exchanger 158 may be diverted to the hot side 108*b* of the turbocharger 108 and may be recovered by the turbocharger 108 to further increase the efficiency of the compressor 102 and/or the IsoC engine 100. Accordingly, the turbocharger 108 may increase the volumetric delivery of the compressor 102 utilizing energy recovered from the exhaust of the combustion engine 106 and/or heat rejected at the compressor 102. In alternative embodiments, however, the IsoC engine 100 may not include a turbocharger 108. In such embodiments without a turbocharger 108, the compressor 102 may be directly coupled to the air filter 110 and configured to draw air directly through the air filter 110 via natural aspiration.

Still referring to FIG. 1, in operation, the IsoC engine 100 is operated by injecting a charge of isothermally compressed air into a cylinder 156 of the combustion engine 106 and injecting fuel supplied by the fuel system 140. The charge of compressed air and the fuel may then atomize and/or mix and be combusted to turn the crankshaft 136 of the combustion engine 106. In some embodiments, the charge of compressed air may be injected simultaneously with the fuel injection. However, in other embodiments, the charge of compressed air may be injected prior to the fuel injection and/or after the fuel injection. Additionally, the IsoC engine 100 is configured to selectively cease fuel injection and operate as a zero-emissions compressed air motor by injecting the charge of compressed air to force the piston 160 in the associated cylinder 156 down away from a top dead center (TDC) position. The IsoC engine 100 is also configured to selectively resume fuel injection and operate the combustion engine 106 by resuming combustion of the compressed air and fuel mixture.

Most generally, the charge of isothermally compressed air from the capacitance tanks 104 may be injected into a cylinder when the associated piston 160 is positioned at or near the TDC position. TDC refers to when a piston 160 within a cylinder 156 is located farthest from the crankshaft 136. TDC also refers to when the force upon the crankshaft 136 is substantially aligned with a longitudinal axis that extends through the center of the cylinder 156. Still further, for purposes of this disclosure, a piston 160 is positioned at TDC when the associated crankshaft 136 angle is at 0 degrees. Thus, any negative angle such as −5 degrees refers to the angle of rotation of the crankshaft 136 prior to a piston 160 reaching its TDC within an associated cylinder 156, and any positive angle such as +5 degrees refers to the angle of rotation of the crankshaft 136 after the piston 160 has passed its TDC within an associated cylinder 156. Additionally, it will be appreciated that the IsoC engine 100 may be configured as a two-stroke combustion engine or alternatively as a four-stroke combustion engine, wherein fuel from the fuel system 140 is also injected into cylinders 156 of the combustion engine 106.

Two-Cycle IsoC Engine Operation

Operation of the IsoC engine 100 when the combustion engine 106 comprises a two-stroke combustion engine includes a power stroke and an exhaust stroke and may be further characterized by the omission of a conventional intake stroke and the omission of a conventional adiabatic compression stroke within the cylinders 156 of the combustion engine 106. Instead, a charge of isothermally compressed air from the capacitance tanks 104 is injected into a cylinder 156 of the combustion engine 106 when the piston 160 of an associated cylinder 156 is at or near TDC. Additionally, the charge of isothermally compressed air from the capacitance tanks 104 may also be described as being injected just prior to ignition when fuel from the fuel system 140 is also added into the cylinder 156.

In some embodiments, the injection of compressed air into a cylinder 156 may occur when the piston 160 of a cylinder 156 is at TDC (0 degrees). However, in other embodiments, the injection of compressed air into a cylinder 156 may occur when the angle of rotation of the crankshaft 136 is between about −30 degrees to about +30 degrees, about −20 degrees to about +20 degrees, about −15 degrees to about +15 degrees, about −10 degrees to about +10 degrees, about −5 degrees to about +5 degrees, about −2 degrees to about +2 degrees, and/or about −1 degrees to about +1 degrees. In yet other embodiments, the injection of compressed air into a cylinder 156 may begin when the associated piston 160 is positioned at TDC and continue until the angle of rotation of the crankshaft 136 is about +1 degrees, about +2 degrees, about +3 degrees, about +5 degrees, about +10 degrees, at about +15 degrees, and/or about +30 degrees. Still further, in alternative embodiments, the injection of compressed air into a cylinder 156 may begin when the angle of rotation of the crankshaft 136 is between about −30 degrees, about −15 degrees, about −10 degrees, about −5 degrees, about −3 degrees, about −2 degrees, and/or about 0 degrees and continue until the angle of rotation of the crankshaft 136 is about TDC, about +1 degrees, about +2 degrees, about +3 degrees, about +5 degrees, about +10 degrees, about +15 degrees, and/or about +30 degrees. In some embodiments, it will be appreciated that the timing and duration of the injection of the compressed air may further be dependent on crankshaft 136 rotational speed and/or other operating or design parameters of the combustion engine 106.

The two-stroke combustion engine configuration of the IsoC engine 100 eliminates the hot adiabatic compression leveraged in traditional combustion engine cycles. By injecting a charge of isothermally compressed air at or near the TDC position, adiabatic compression heat is not introduced into the cycle and the compressed air-fuel mixture remains cool to the threshold of spark ignition. Consequently, the two-stroke IsoC engine 100 has substantially no autoignition or detonation constraints, allowing designs and embodiments that may include higher static compression ratios of up to about 100:1, greater flexibility in fueling choices, improved thermal efficiency, lowered emissions, and the capacity to operate efficiently on very lean air-fuel mixtures. Accordingly, an IsoC engine 100 may combust lean mixtures (e.g. combustion of mixtures of compressed air and fuel with a high ratio of air to fuel in the cylinder 156), which may increase fuel efficiency and lower exhaust emissions without causing overheating or a significant loss of power. In some embodiments, the air-to-fuel ratio may be about 15:1, about 20:1, about 25:1, about 30:1, about 40:1, about 50:1, about 60:1, and/or about 70:1. In some embodiments, the IsoC engine 100 may obtain an equivalent and/or greater amount of power from combusting a lean air-to-fuel ratio mixture as a traditional adiabatic compression engine would obtain combusting a stoichiometric air-to-fuel mixture. Accordingly, the IsoC engine 100 may allow for greater power output with a lower fuel requirement, thereby giving the IsoC engine 100 a higher fuel efficiency than the fuel efficiency of a traditional adiabatic compression engine.

By enabling a combustion engine 106 to operate with air-to-fuel ratios that would otherwise damage traditional adiabatic compression engines, longstanding internal combustion engine design constraints may be effectively reduced and/or altogether eliminated. Additionally, higher compression pressures required for higher compression ratio operation are created and supplied by the pneumatic components of IsoC engine 100, eliminating the requirement that compression forces be handled within the combustion engine 106. Consequently, an IsoC engine 100 may comprise a combustion engine 106 of a much lighter duty construction than a traditional combustion engine having a substantially similar static compression ratio.

Four-Cycle IsoC Engine Operation

Operation of the IsoC engine 100 when the combustion engine 106 comprises a four-stroke combustion engine includes an air motor power stroke, a compression stroke, a combustion power stroke, and an exhaust stroke and may be further characterized by the substitution of the air motor power stroke for a conventional intake stroke within the four-stroke cycle. Alternatively, operation of the IsoC engine 100 in a four-stroke configuration may be further described as a four-stroke cycle composed of two interlaced and alternating two-stroke cycles: (1) a two-stroke air motor sub-cycle and (2) a two-stroke combustion engine sub-cycle, wherein the two types of power strokes are executed on alternating rotations of the crankshaft 136 and the "exhaust" from the air power stroke becomes the "intake" for the internal combustion process. With an exhaust valve of the cylinder 156 closed, a charge of isothermally compressed air from the capacitance tanks 104 is injected into a cylinder 156 of the combustion engine 106 when the piston 160 of the associated cylinder 156 is at or near TDC at the beginning of the air motor power stroke. In some embodiments, the injection of compressed air into a cylinder 156 may begin when the associated piston 160 is positioned at TDC and continue until the angle of rotation of the crankshaft 136 is about +1 degrees, about +2 degrees, about +3 degrees, about +5 degrees, about +10 degrees, about +15 degrees, and/or about +30 degrees. Still further, in alternative embodiments, the injection of compressed air into a cylinder 156 may begin when the angle of rotation of the crankshaft 136 is between about −30 degrees, about −15 degrees, about −10 degrees, about −5 degrees, about −3 degrees, about −2 degrees, and/or about 0 degrees and continue until the angle of rotation of the crankshaft 136 is about TDC, about +1 degrees, about +2 degrees, about +3 degrees, about +5 degrees, about +10 degrees, about +15 degrees, and/or about +30 degrees. In some embodiments, it will be appreciated that the timing and duration of the injection of the compressed air may further be dependent on crankshaft 136 rotational speed and/or other operating or design parameters of the combustion engine 106.

The charge of compressed air may fill the cylinder 156 and absorb waste heat lingering from a previous combustion event. The charge of compressed air may gain additional expansion as a result of absorbing the waste heat. Accordingly, the air within the cylinder 156 may propel the piston 160 downward. In some embodiments, the propulsion of the piston away from the TDC position may significantly reduce and/or eliminate conventional pumping losses by substituting a compressed air power stroke for the conventional intake event. Accordingly, the injection of the charge of isothermally compressed air may increase power output of the IsoC engine 100 via the scavenging of waste heat without injecting additional fuel into the cylinder.

In some embodiments, the charge of compressed air injected into a cylinder 156 may be dependent on the static compression ratio of the combustion engine 106. For example, a charge of compressed air having a pressure of about 147 pounds per square inch (psi; about 10 bar) may be injected at about TDC into a cylinder 156 for a combustion engine 106 having a compression ratio of about 10:1. This would result in about 14.7 psi of pressure within the cylinder 156 after expansion when the piston 160 is at bottom dead center (BDC) position. Accordingly, the pressure of the charge of compressed air injected into the cylinder 156 may be adjusted so that the pressure inside the cylinder 156 of the combustion engine 106 at BDC is about 14.7 psi and/or any other pressure that promotes proper combustion within the cylinder 156. In some embodiments, the compression stroke may begin in a cooler environment as compared to a traditional adiabatic compression engine because the isothermal compression charge introduced at TDC has been expanded at a ratio of 10:1 when the piston 160 reaches BDC, giving it a temperature below that of the ambient air at the beginning of the upstroke. Additionally, the heated surfaces of the cylinder 156 may drive a more aggressive expansion of the compressed gases during the compressed air power stroke, scavenging this waste heat and delivering it to the crankshaft 136 in the form of additional work. As a result of the cooler environment, the crankshaft 136 may experience a decreased load on the upstroke that promotes a cooler compression charge and an increased efficiency from a combustion event that occurs when fuel is injected into the cylinder 156 as the piston 160 returns to the TDC position. After ignition and combustion, the power stroke and the exhaust stroke of the four-stroke IsoC engine 100 may be substantially similar to the power stroke and the exhaust stroke of a traditional four-stroke adiabatic compression engine.

Still referring to FIG. 1, the IsoC engine 100 may be installed in a vehicle and configured to propel the vehicle. It is contemplated by this disclosure that the IsoC engine 100 may be employed in various applications, including but not limited to, vehicles, heavy machinery, power plants, generator sets, combustion engine-powered tools and equipment, surface and submarine sea craft, and any other suitable combustion engine-powered apparatus where increased fuel efficiency, decreased emissions, reduced operating temperatures and/or less restrictive design constraints may be beneficial.

Embodiments of both the two-stroke combustion engine configuration and the four-stroke combustion engine configuration of the IsoC engine 100 may also provide additional benefits. By coupling the compressor 102 to the combustion engine 106 through the crankshaft 136 via a selectively engaged compressor clutch 130, the IsoC engine 100 is configured for regenerative braking which may further increase the efficiency of the IsoC engine 100. During deceleration of the IsoC engine 100, energy may be transferred to the compressor 102 through the crankshaft 136 by engaging the compressor clutch 130. The compressor 102 may thus recover energy normally lost during deceleration and use this energy to isothermally compress additional air and replenish a supply of compressed air stored in the capacitance tanks 104. As a result, the "braking charge" may be used to propel a vehicle or other piece of equipment from an idle position, further reducing fuel consumption and emissions.

The IsoC engine 100 may also comprise no idling requirement, similar to current gas-electric hybrid applications. When a vehicle or other apparatus comprising an IsoC engine 100 requires no demand for power and/or the vehicle or apparatus remains idle, the IsoC engine 100 may shut down completely by discontinuing the injection of compressed air from the capacitance tanks 104 or by selectively operating the shutoff valve 118. Additionally, the IsoC engine 100 may also cease fuel delivery from the fuel system 140. The IsoC engine 100 may then be restarted as a compressed air motor utilizing compressed air injection only. Upon a demand for acceleration, the IsoC engine 100 may resume compressed air injection into the combustion engine 106 and may further resume fuel injection and fuel combustion of the compressed air and fuel mixture when the fuel combustion may be performed with a maximum efficiency. The dual drive functionality of the IsoC engine 100, operating as both a combustion engine and a compressed air motor, may be selectively managed to optimize performance, efficiency and emissions.

The IsoC engine 100 may also be configured for a zero emissions mode. In some embodiments, the IsoC engine 100 may be operated by driving the pistons 160 of the combustion engine 106 without fuel from the fuel system 140 and only with a charge of compressed air provided by the capacitance tanks 104. For example, on trips of short duration and/or in heavy start-stop traffic, the IsoC engine 100 may utilize its zero emissions air-motor mode first and resort to fuel combustion only when combustion can be performed with a maximum efficiency. Further, at highway speeds and/or during extended cruising, fuel combustion may be selectively engaged to provide continuous power and replenish any depleted capacity of the capacitance tanks 104.

The IsoC engine 100 may also be configured to decrease carbon emissions. The IsoC engine 100 comprises a carbon dioxide sequestration filter 120 between the capacitance tanks 104 and the combustion engine 106. The carbon dioxide sequestration filter 120 comprises a replaceable cartridge of granulated metal oxides that may sequester carbon dioxide during continuous duty operation. Fueling the IsoC engine 100 using a true carbon-neutral biofuel while the pneumatic hardware is configured to sequester free atmospheric carbon dioxide may lead to a net carbon-negative operating cycle.

The IsoC engine 100 may also be configured for grid-powered operation. The IsoC engine 100 comprises an external fill port 116 configured to couple to an external compressed air source to allow the at least one capacitance tank 104 to receive compressed air through the external fill port 116 from the external compressed air source. Accordingly, the capacitance tanks 104 may be filled using a stationary pump and/or other fixed or mobile compressed air source.

The IsoC engine 100 may be configured to take advantage of some or all of the efficiency increasing benefits described herein. Such benefits as increased static compression ratios, improved lean burn capacity, greater flexibility in fueling options, regenerative braking, no engine idling requirement, and a zero emissions air motor mode may be selectively employed to maximize the efficiency of a vehicle or other apparatus having an IsoC engine 100. Accordingly, by recovering otherwise rejected heat energy and selectively implementing fuel combustion, the IsoC engine 100 is capable of attaining a substantial increase in fuel efficiency over a traditional adiabatic compression engine. In some embodiments, the IsoC engine 100 may also attain higher fuel efficiencies than traditional gas-electric hybrid vehicles. For example, in some embodiments, a passenger vehicle having an IsoC engine 100 may attain fuel efficiencies of at least about 40 miles per gallon (mpg), at least about 50 mpg, at least about 60 mpg, at least about 70 mpg, at least about 80 mpg, and/or at least about 90 mpg. Additionally, the IsoC engine 100 may be selectively configured so that its attributes are directed towards maximizing power density and power output rather than fuel economy, for high performance and racing purposes, and other applications where fuel efficiency is considered secondary to the requirement to maximize power output and performance.

Figure 2:
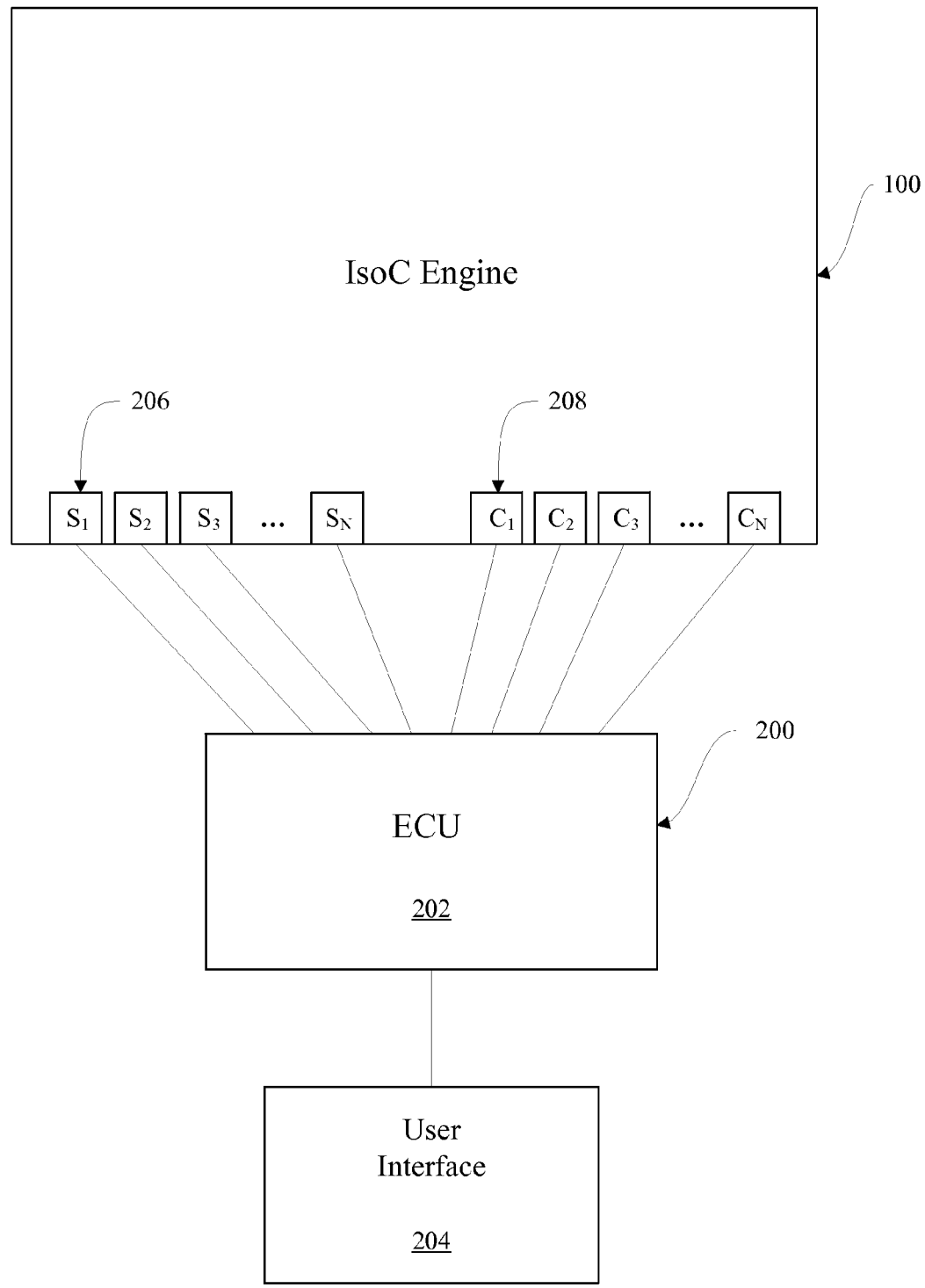
FIG. 2 is a schematic diagram of an isothermal compression based combustion engine (IsoC) electronic control system according to an embodiment of the disclosure.

Referring now to FIG. 2, a schematic diagram of an isothermal compression based combustion (IsoC) engine 100 electronic control system 200 is shown according to an embodiment of the disclosure. Electronic control system 200 is electronically coupled to the IsoC engine 100 of FIG. 1. Electronic control system 200 comprises an electronic control unit (ECU) 202 configured to monitor operating parameters of the IsoC engine 100 through a plurality of sensor inputs 206. ECU 202 also comprises a plurality of control outputs 208 and is configured to control the operation of the IsoC engine 100 through the plurality of control outputs 208 in response to monitoring operation of the IsoC engine 100 through the sensor inputs 206. The electronic control system 200 also comprises a user interface 204 that may be configured for selectively inputting a demand for power, efficiency, acceleration, and/or reduction of acceleration from an IsoC engine 100. The user interface 202 may comprise a pedal, a toggle switch, a throttle, a trigger, or any other adjustable means for selectively inputting a demand for power, efficiency, acceleration, and/or reduction of acceleration in a vehicle or other apparatus comprising an IsoC engine 100.

The ECU 202 may generally be configured as an Application Specific Integrated Circuit (ASIC) and/or comprise a general purpose processor. The ECU 202 may also be configured to be programmable and/or store one or more fuel maps and air maps to allow the ECU 202 to control operation of the IsoC engine 100 through the control outputs 208 as a result of monitoring the sensor inputs 206. For example, the ECU 202 may more heavily employ the compressed air from the capacitance tanks 204 at low crankshaft 136 rotational speeds and more heavily employ the fuel system 140 at high crankshaft 136 rotational speeds in a manner similar to traditional hybrid gas-electric engines. Furthermore, the ECU 202 may be configured to manage pressures and temperatures throughout the IsoC engine 100, govern the balance between air-motor and fuel combustion drive modes, and modify combustion mixtures as a result of one or more fuel maps stored in the ECU 202.

To implement control of the IsoC engine 100, the ECU 202 may monitor the plurality of sensors inputs 206 that may communicate information to the ECU 202. Such information may include temperature and/or pressure of the compressor 102, the combustion engine 106, the turbocharger 108, the pressure regulator 122, the air rail 124, the air injectors 126, the exhaust manifold 128, the compressor exhaust 132, the intake pipe 134, the fuel system 140, the fuel reservoir 142, the fuel pump 144, the fuel rail 148, the fuel injectors 150, the exhaust pipe 152, the catalytic converter 154, the cylinders 156, and/or any other component of the IsoC engine 100. Additionally, the sensor inputs 206 may communicate information to the ECU 202 that is related to the air capacitance level of the capacitance tanks 104, the status of the check valve 114, connection status to the external fill port 116, function of the air injectors 126, fuel level in the fuel reservoir 142, function of the fuel injectors 150, crankshaft 136 angle, crankshaft 136 rotational speed, and/or any other operating and/or status parameter necessary for the ECU 202 to exhibit control of the IsoC engine 100.

As a result of monitoring the sensor inputs 206, the ECU 202 may control the IsoC engine 100 through the plurality of control outputs 208. The control outputs 208 may generally comprise selectively operating the compressor 102, dispersing compressed air from the capacitance tanks 104, selectively operating the combustion engine 106, selectively operating the shutoff valve 118, selectively adjusting the pressure regulator 122, selectively controlling and/or operating the air injectors 126, selectively engaging and disengaging the compressor clutch 130, selectively operating the compressor fan 138, selectively controlling and/or operating the fuel system 140, and/or selectively controlling and/or operating the fuel injectors 150. The ECU 202 may also control the IsoC engine 100 through the plurality of control outputs 208 as a result of a change in a demand for power, efficiency, acceleration, and/or reduction in acceleration received by the ECU 202 through the user interface 204. The ECU 202 may also control the IsoC engine 100 through the control outputs 208 in accordance with preloaded fuel maps and/or air maps stored in the ECU 202. Additionally, the ECU 202 may be configured to continuously vary the timing of compressed air injection, the timing of fuel injection, and the timing of spark ignition.

Figure 3:
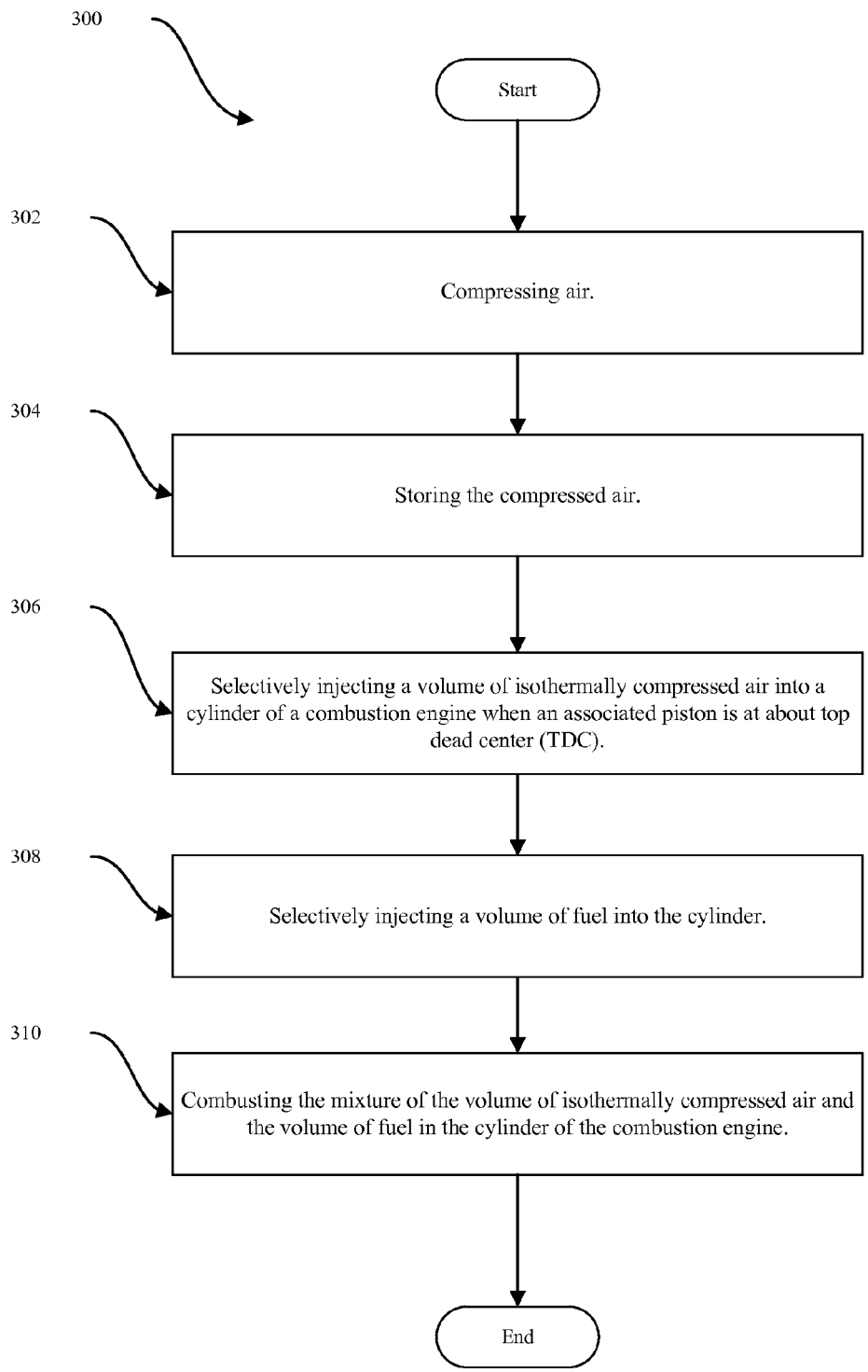
FIG. 3 is a flowchart of a method of operating an isothermal compression based combustion engine (IsoC) according to an embodiment of the disclosure.

Referring now to FIG. 3, a flowchart of a method 300 of operating an isothermal compression based combustion (IsoC) engine 100 is shown according to an embodiment of the disclosure. The method 300 may begin at block 302 by isothermally compressing air using a compressor 102. In some embodiments, the compressor 102 may isothermally compress the air by dissipating heat through at least one heat exchanger 158. The method may continue at block 304 by storing the compressed air in at least one capacitance tank 104. The method may continue at block 306 by selectively injecting a volume of isothermally compressed air into a cylinder 156 of a combustion engine 106 when an associated piston 160 is at about top dead center (TDC). The method may continue at block 308 by selectively injecting a volume of fuel into the cylinder 156. In embodiments having a two-stroke combustion engine, the volume of fuel may be injected simultaneously with the compressed air. In embodiments having a four-stroke combustion engine, the volume of fuel may be injected during the air-motor power stroke and/or the compression stroke of the four-stroke combustion engine 106. However, in some embodiments, no volume of fuel may be injected into the cylinder 156. The method may conclude at block 310 combusting the mixture of the volume of isothermally compressed air and the volume of fuel in the cylinder of the combustion engine 106. In some embodiments, combusting the mixture of the volume of isothermally compressed air and the volume of fuel may be initiated by selectively firing a spark plug in the cylinder 156 of the combustion engine 106.

Figure 4:
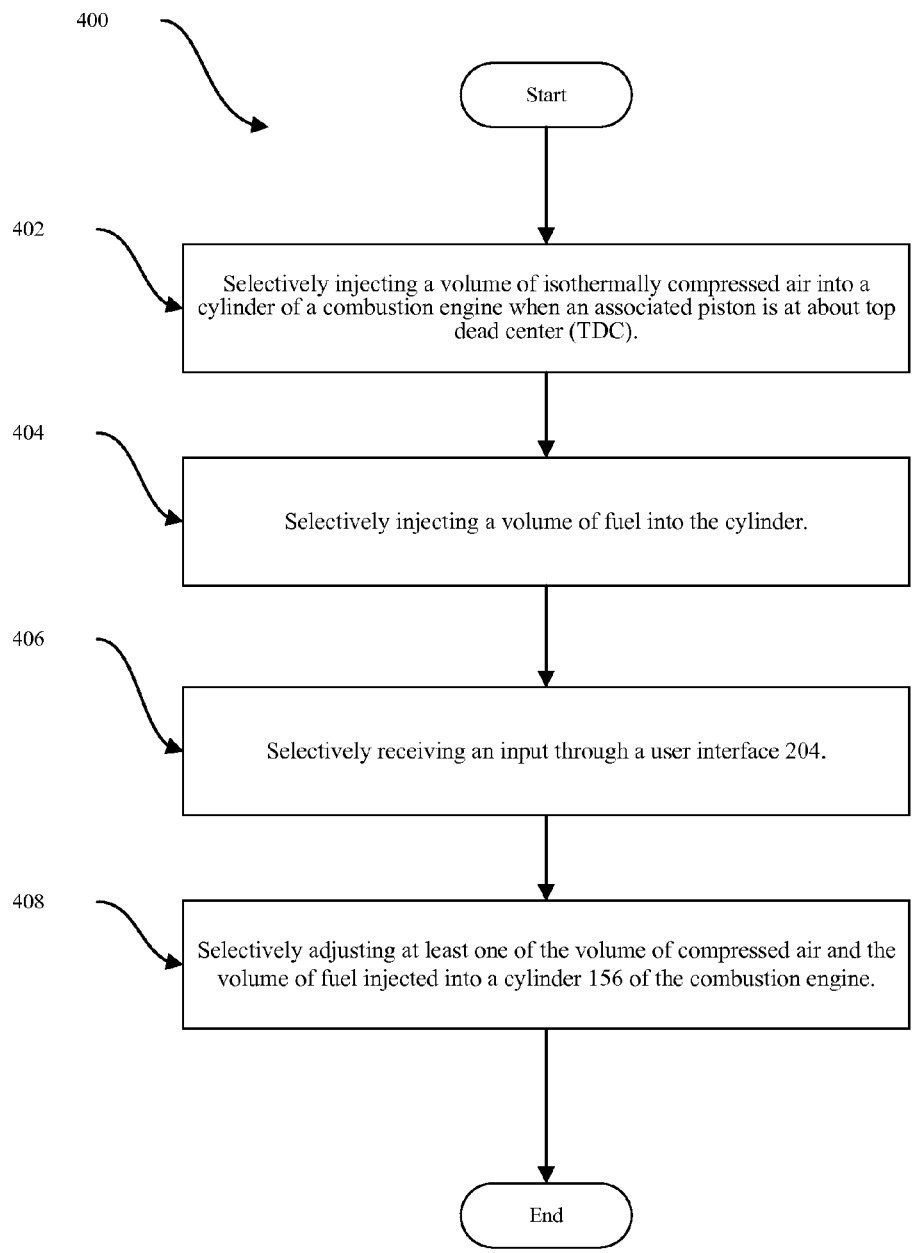
FIG. 4 is a flowchart of a method of controlling an isothermal compression based engine (IsoC) according to an embodiment of the disclosure.

Referring now to FIG. 4, a flowchart of a method 400 of controlling an isothermal compression based combustion (IsoC) engine 100 is shown according to an embodiment of the disclosure. The method 400 may begin at block 402 by selectively injecting a volume of isothermally compressed air into a cylinder 156 of a combustion engine 106 when an associated piston 160 is at about top dead center (TDC). The method may continue at block 404 by selectively injecting a volume of fuel into the cylinder 156. In embodiments having a two-stroke combustion engine, the volume of fuel may be injected simultaneously with the compressed air. In embodiments having a four-stroke combustion engine, the volume of fuel may be injected during the air-motor power stroke and/or the compression stroke of the four-stroke combustion engine. However, in some embodiments, no volume of fuel may be injected into the cylinder 156. The method may continue at block 406 by selectively receiving an input through a user interface 204. The method may conclude at block 408 by selectively adjusting at least one of the volume of compressed air and the volume of fuel injected into a cylinder 156 of the combustion engine 106. In some embodiments, selectively adjusting at least one of the volume of compressed air and the volume of fuel may be implemented by the ECU 202 communicating with and/or controlling at least one control output 208. Further, in some embodiments, the ECU 202 may implement the selective adjustment of at least one of the volume of compressed air and the volume of fuel in response to communicating with at least one sensor input 206.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc., greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined above is also specifically disclosed. Use of the term "optionally" with respect to any element of a claim means that the element is required, or alternatively, that the element is not required, both alternatives being within the scope of the claim. Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

What is claimed is:

1. An isothermal compression based combustion (IsoC) engine, comprising:
a compressor configured to isothermally compress a volume of air;
at least one capacitance tank coupled to the compressor and configured to store the volume of isothermally compressed air; and
a combustion engine configured to:
receive at least a portion of the volume of isothermally compressed air from the at least one capacitance tank and into a cylinder of the combustion engine;
at least one of (1) selectively inject a volume of fuel into the cylinder and ignite the volume of fuel in the presence of the volume of air in the cylinder and (2) selectively omit the injection of a volume of fuel and expand the volume of air in the cylinder using no combustion.

2. The IsoC engine of claim 1, wherein the volume of air is received into the cylinder when an associated piston is at about a top dead center (TDC) position.

3. The IsoC engine of claim 1, wherein the volume of air is received into the cylinder when an associated piston is between about a top dead center (TDC) position and about a 20 degree rotation beyond the TDC position.

4. The IsoC engine of claim 1, wherein the compressor comprises a multistage, intercooled compressor and is configured to dissipate heat generated as a result of compressing the volume of air.

5. The IsoC engine of claim 1, wherein the volume of compressed air received into the cylinder comprises a temperature at about ambient temperature of the surrounding environment.

6. The IsoC engine of claim 1, wherein the combustion engine is configured to substantially eliminate autoignition of a volume of fuel selectively injected into the cylinder.

7. The IsoC engine of claim 1, further comprising: a turbocharger driven by an exhaust stream from the combustion engine and configured to force induce an intake of the compressor.

8. The IsoC engine of claim 1, wherein the compressor is coupled to a crankshaft of the combustion engine through a compressor clutch, and wherein the crankshaft is configured to operate the compressor when the compressor clutch is engaged.

9. The IsoC engine of claim 1, wherein the combustion engine comprises a two-stroke operating cycle comprising an exhaust stroke and a working stroke, and wherein the receiving the at least a portion of the volume of isothermally compressed air volume from the at least one capacitance tank and into a cylinder and selective injection of the volume of fuel into the cylinder occur substantially simultaneously.

10. The IsoC engine of claim 1, wherein the combustion engine comprises a four-stroke operating cycle comprising an air-motor power stroke, a compression stroke, a combustion power stroke, and an exhaust stroke, wherein the injection of the at least a portion of the volume of isothermally compressed air into the cylinder occurs when an associated piston is at about a top dead center (TDC) position at the beginning of the air-motor power stroke, and wherein the selective injection of the volume of fuel occurs during at least one of the air-motor power stroke and the compression stroke.

11. A method of operating an isothermal compression based combustion (IsoC) engine, comprising:
   isothermally compressing a first volume of air;
   passing the isothermally compressed volume of air to at least one capacitance tank;
   storing the isothermally compressed volume of air in the at least one capacitance tank;
   injecting a second volume of isothermally compressed air into a cylinder of a combustion engine when an associated piston is at about a top dead center (TDC) position;
   selectively injecting a volume of fuel into the cylinder of the combustion engine; and
   combusting the mixture of the second volume of isothermally compressed air and the volume of fuel in the cylinder of the combustion engine.

12. The method of claim 11, wherein selectively injecting a volume of fuel into the cylinder of the combustion engine occurs simultaneously with the injecting a second volume of isothermally compressed air.

13. The method of claim 11, further comprising:
   selectively ceasing the injection of a volume of fuel into the combustion cylinder; and
   continuing to inject the second volume of isothermally compressed air into a cylinder of a combustion engine when an associated piston is at about a top dead center (TDC) position to cause the combustion engine to operate.

14. The method of claim 11, wherein the injecting the second volume of isothermally compressed air into the cylinder of the combustion engine and the selectively injecting the volume of fuel into the cylinder of the combustion engine occurs substantially simultaneously.

15. The method of claim 11, wherein the injecting the second volume of isothermally compressed air into the cylinder of the combustion engine occurs when the associated piston is at about a top dead center (TDC) position prior to an air-motor power stroke and the selectively injecting the volume of fuel into the cylinder of the combustion engine occurs during at least one of the air-motor power stroke and the compression stroke.

16. A method of controlling an isothermal compression based combustion (IsoC) engine, comprising:
   selectively injecting a volume of isothermally compressed air into a cylinder of a combustion engine when an associated piston is at about a top dead center (TDC) position;
   selectively injecting a volume of fuel into the cylinder;
   selectively receiving an input through a user interface; and
   selectively adjusting at least one of the volume of compressed air and the volume of fuel injected into a cylinder of the combustion engine during subsequent rotations of a crankshaft of the combustion engine.

17. The method of claim 16, wherein the selectively adjusting at least one of the volume of compressed air and the volume of fuel injected into the cylinder may be implemented by an electronic control unit (ECU) in response to monitoring at least one sensor input.

18. The method of claim 17, wherein the selectively adjusting at least one of the volume of compressed air and the volume of fuel injected into the cylinder may be implemented by the ECU communicating with at least one control output.

19. The method of claim 18, wherein the selectively adjusting at least one of the volume of compressed air and the volume of fuel injected into the cylinder may be implemented by the ECU in response to an input received through the user interface.

20. The method of claim 19, wherein the ECU is configured to selectively control the IsoC engine in accordance with at least one of a preloaded fuel map stored in the ECU and a preloaded air map stored in the ECU.

* * * * *